(12) United States Patent
Back et al.

(10) Patent No.: US 7,846,332 B1
(45) Date of Patent: Dec. 7, 2010

(54) APPARATUS AND METHOD FOR SELF-HEATING AND SELF-HYDRATING FOODS AND BEVERAGES

(75) Inventors: Dwight D. Back, Pembroke Pines, FL (US); Lawrence R. Grzyll, Merritt Island, FL (US); Deborah Stewart, legal representative, Merritt Island, FL (US); Robert P. Scaringe, Rockledge, FL (US); R. Paul Roth, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 707 days.

(21) Appl. No.: 11/767,672

(22) Filed: Jun. 25, 2007

Related U.S. Application Data

(60) Provisional application No. 60/815,831, filed on Jun. 23, 2006.

(51) Int. Cl.
*B01D 61/00* (2006.01)
*A47J 27/62* (2006.01)
*B65D 81/18* (2006.01)

(52) U.S. Cl. .............. 210/261; 210/257.2; 210/295; 426/108; 426/106; 426/109; 426/132; 126/373.1; 126/369; 126/369.1

(58) Field of Classification Search ............ 210/257.2, 210/261, 295; 426/109, 113, 108, 132, 106; 126/373, 369, 369.1, 263.05
See application file for complete search history.

(56) References Cited

U.S. PATENT DOCUMENTS

| | | | |
|---|---|---|---|
| 3,079,911 A | 3/1963 | Ryan et al. | |
| 3,760,984 A * | 9/1973 | Theeuwes | 222/95 |
| 4,515,585 A * | 5/1985 | Urquhart et al. | 604/85 |
| 4,522,190 A | 6/1985 | Kuhn et al. | |
| 4,559,921 A | 12/1985 | Benmussa | |
| 4,751,119 A | 6/1988 | Yukawa | |
| 4,753,085 A | 6/1988 | Labrousse | |
| 4,809,673 A | 3/1989 | Charvin | |
| 4,819,612 A | 4/1989 | Okamoto et al. | |
| 4,949,702 A | 8/1990 | Suzuki et al. | |
| 5,111,668 A | 5/1992 | Parrish et al. | |
| 5,113,666 A | 5/1992 | Parrish et al. | |
| 5,117,809 A | 6/1992 | Scaringe et al. | |
| 5,141,531 A | 8/1992 | Parrish | |
| 5,205,277 A | 4/1993 | Chao-Tsung | |
| 5,220,909 A | 6/1993 | Pickard et al. | |
| 5,233,981 A * | 8/1993 | Miyashita | 607/114 |
| 5,289,695 A | 3/1994 | Parrish et al. | |
| 5,291,750 A | 3/1994 | Parrish et al. | |
| 5,355,869 A | 10/1994 | Pickard et al. | |

(Continued)

OTHER PUBLICATIONS

Bell, W.L., et al., "Applications of new chemical sources," Technical Report NATICK/TR-01/004, Phase I Final Report, Jan. 2001.

(Continued)

*Primary Examiner*—Ana M Fortuna
(74) *Attorney, Agent, or Firm*—Crowell & Moring LLP

(57) ABSTRACT

A method and components for heating and hydrating foods and beverages using an exothermic and pressure generating chemical reaction are described. The exothermic reaction can be initiated by water, spark, electrical impulse, squib, friction, or shock to heat non-potable water and force the water through a membrane filter, thereby producing heated, potable water.

8 Claims, 14 Drawing Sheets

U.S. PATENT DOCUMENTS

| | | | |
|---|---|---|---|
| 5,390,659 | A | 2/1995 | Scaringe et al. |
| 5,628,304 | A * | 5/1997 | Freiman ................ 126/263.09 |
| 5,632,904 | A | 5/1997 | Samad et al. |
| 5,975,074 | A * | 11/1999 | Koiso et al. ................. 126/204 |
| 6,303,039 | B1 | 10/2001 | Back et al. |
| 6,544,400 | B2 * | 4/2003 | Hockaday et al. ........... 205/338 |
| 6,638,431 | B2 | 10/2003 | Back et al. |
| 6,823,860 | B2 * | 11/2004 | Igaki et al. ............. 126/263.05 |
| 7,258,117 | B2 * | 8/2007 | Payen et al. ............ 126/263.08 |
| 7,438,801 | B2 | 10/2008 | Scaringe |
| 7,652,228 | B2 * | 1/2010 | Igaki et al. ................. 219/401 |
| 7,709,035 | B2 * | 5/2010 | Richardson et al. ......... 426/109 |
| 7,720,362 | B2 * | 5/2010 | Arnold et al. ............... 392/470 |

OTHER PUBLICATIONS

Bell, W.L., et al., "Applications of new chemical sources," Report No. A142314, Phase II Final Report, May 2001.

Pickard, D. W., Oleksyk, L. E., Trottier, R.L., "Development of the Flameless Ration Heater for the Meal, Ready-to-Eat", US Army Natick RD&E Center, Technical Report Natick/TR-93/030, 1993.

Hill, B. M., LaBrode A. J., Sherman P., Zanchi J. A., Milch L., Pickard D., Smith N., Johnson W., Carlson J., "Analysis of Hydrogen Emission in Meal, Ready-to-Eat Heaters and Discussion of New Heater Technology Initiatives", U.S. Army Soldier and Biological Chemical Command, Soldier Systems Center, Natick, MA 01760-5018, TR-01/005L, Feb. 2001.

* cited by examiner

APPARATUS AND METHOD FOR SELF-HEATING AND SELF-HYDRATING FOODS AND BEVERAGES

CROSS REFERENCE TO RELATED APPLICATIONS

This application claims the benefit of priority of the filing date of U.S. provisional application 60/815,831, filed Jun. 23, 2006, the disclosure of which is expressly incorporated by reference herein its entirety.

FEDERALLY SPONSORED RESEARCH OR DEVELOPMENT

Developed under contract W911QY-06-C-0008 from the U.S. Army Natick Soldier Center.

BACKGROUND OF THE INVENTION

Many chemical heaters have been proposed in the past. Hill et al. (2001) provides one overview of potential reactions. The object of this invention is to teach a device that not only generates temperatures in excess of about 150° F. over about 15 minutes or less, but also provides the means to filter microbes from non-potable water using the same exothermic reaction.

U.S. Pat. No. 3,079,911 (Ryan et al., 1963) describes a heating device that generates heat by the oxidation of a metal, activated by the addition of water. The reactants are a mixture of aluminum, copper sulfate, potassium chlorate, and calcium sulfate, which generates flammable or corrosive gases. U.S. Pat. No. 4,559,921 (Benmussa, 1985) shows a self-heating device using a sealed container holding calcium oxide and water. The calcium oxide and water are kept separate by a sealed pouch. A tearing element affixed to the pouch opens the pouch and the container, allowing water to contact the calcium oxide, starting the exothermic reaction to heat the food. Similarly, U.S. Pat. No. 4,809,673 (Charvin, 1989) describes the hydration of calcium oxide to generate heat. The heat output per weight (of the dry material) is approximately 501 Btu/lb and inferior to other reactions. U.S. Pat. No. 5,205,277 (Chao-Tsung, 1993) also describes a self-heating container using three heating packs based on a calcium oxide reaction. U.S. Pat. No. 4,753,085 (Labrousse, 1988) describes reactions using sodium hydroxide with hydrochloric acid. Although this reaction produces more heat per weight of heater material (565 Btu/lb) than the hydration of calcium oxide discussed above, it requires the handling of a strong acid, HCl. The inventors also describe the oxidation of iron powder to produce heat, but this reaction is muted by water. As will be discussed later in this section, these reactions have a heat of reaction about an order of magnitude less than the nameless ration heater (FRH) reaction at 6267 Btu/lb. The FRH reaction (Mg reacted with water and catalyzed by Fe), was originally developed by the U.S. Army Meals-Ready-to-Eat (MRE's).

In U.S. Pat. No. 4,751,119 (Yukawa, 1988), a liquid and solid reactant are combined to produce heat. The reactants include quicklime (CaO), sodium hydroxide, cobalt, chromium, iron, iron hydroxide, magnesium, manganese, magnesium chloride, molybdenum, tin oxide (II), titanium, sodium, calcium hydroxide, sulfuric acid, nitric acid, and metallic sodium. The reactants generate an oxide reacting with oxygen at room temperature in the form of a metal or a metallic compound and have an exothermic characteristic. The reaction has a heat output per weight of reactant of only 721 Btu/lb requiring large masses of material. This again is about one order of magnitude less than the FRH reaction.

In another chemical heater, U.S. Pat. No. 4,819,612 (Okamoto et al., 1989) describes a container capable of heating beverages or soups when ignited (by a match, for instance). This heater functions by oxidation or combustion using potassium permanganate, manganese dioxide, trilead tetraoxide, barium peroxide, bromates, and chlorates with the combustible compounds including metal powders of iron, silicon, ferrosilicon, aluminum, magnesium, and copper. The reaction is not activated by water but by an initiator such as a spark lighter. The reaction temperature can exceed 1000° C., which creates many packaging problems. U.S. Pat. No. 4,949,702 (Suzuki et al., 1990) also describes a self-heating device including a heater within a container that does not use water. The heater includes a pyrogen of high heating value and an initiator that is ignited by spark. Both elements are metal oxides or metals. This reaction may also require a power source, which is undesirable for a food heater/hydrator.

Bell et al. (2001) also propose a two-component solid reaction that is initiated by water. This reaction uses combinations of CaO, $AlCl_3$, and $P_2O_5$. Reactions involving CaO and $AlCl_3$ consume water, whereas reactions with CaO and $P_2O_5$ require water as a reactant but regenerate it so there is a net use of oxygen. The heat of reaction for these combinations is also inferior to the FRH reaction.

The present inventors also developed a "Self-Contained Atmospheric Protective Ensemble" (SCAPE) suit heating system for NASA (Scaringe et al., 1992). This project included an exhaustive study of potential chemical heating candidates, including electrolyte/water (solid/water, liquid/water, gas/water) and phase change materials. Any electrolyte/water system that was toxic, corrosive, or carcinogenic was not considered. Sodium oxide ($Na_2O$) was found to be a viable reaction candidate for energy generation. This project also developed an automatic water control valve using a bimetallic creep-disk valve that administered water over a 2-hour period for heating. A wicking component was also developed to transport water through the $Na_2O$ bed to prevent caking. Although this reaction is rapid and produces high temperatures, its heat of reaction is still inferior to the FRH reaction.

U.S. Pat. Nos. 5,117,809 (Scaringe et al., 1992) and 5,390,659 (Scaringe et al., 1995) describe a heater material utilizing the same alloy of magnesium and iron as described in U.S. Pat. No. 4,522,190 (Kuhn et al., 1985) but with a different packaging arrangement. U.S. Pat. No. 5,117,809 (Scaringe et al., 1992) also describes the use of other known exothermic reaction materials, including calcium oxide, anhydrous calcium chloride, magnesium oxide, zeolite molecular sieves, and silica gel. All of these react with water to give off heat; however, the Mg—Fe system produces the best exothermic heats of reaction.

The current FRHs make use of a reaction between Mg and water catalyzed by Fe. The Army has also performed considerable R&D on this reaction (see Pickard et al., 1993-1994). This reaction is initiated by water with a heat of reaction equal to 6,267 Btu/lb Mg. Portable heaters that function well in the presence of water are more desirable because water serves both to transfer heat from the heater to the food or other object to be heated, particularly by evaporation/condensation, and to limit the temperature of the heater by removing the heat of vaporization once the boiling point of water is reached. U.S. Pat. No. 4,522,190 (Kuhn et al., 1985) describes a heater material for heating food and other items, which came to be known as the FRH. The heater is a composite of "supercorroding" metallic alloy powder distributed throughout a porous ultra-high-molecular-weight (UHMW) polyethylene. The supercorroding metallic alloy is preferably a powdered combination of magnesium and iron, which when wetted with an electrolytic solution such as aqueous sodium chloride produces heat.

The heat of reaction for Corrodalloy-5 (FRH chemical composition commercially available through Dymatron) with water produces large exothermic heats. We concluded from a study of the literature, as well as screening experiments, that this reaction is the preferred basis for heating and hydrating food and beverages. Numerous reactions were evaluated involving the chemicals $P_2O_5$, CaO, $Na_2O$, $AlCl_3$, and $KO_2$, to name a few, but the FRH reaction was superior in exothermic heat of reaction, providing a foundation for this invention. The FRH reaction also has advantages in that it produces a gas product for pressurization and is familiar to the Army as a component in MRE's. The FRH reaction unmodified was not directly suitable for a heating and hydrating system, so improvements and modifications to the formulation were needed and are the subject of this invention.

The second component of the heater and hydrating device is the purification of water from a source such as a lake. Several processes can be used to purify water for use in food or beverage rations, including ion exchange, distillation, and membrane filtration. Ion exchange is not feasible because large quantities of material are needed. Distillation is undesirable because it requires power. Membrane filtration is really the only viable option.

Hydration Technologies, Inc. (HTI) has developed a pouch design ("X-Pack") for forward osmosis (www.hydrationtech.com). This design uses forward osmosis, driven by an electrolyte on the downstream side of a reverse osmosis (RO) membrane. The filtration time for this membrane system is also quite lengthy, requiring up to 6-12 hours for 12 fl oz of water. Higher temperatures may increase this flux rate to less than 30 minutes. To overcome the osmotic pressure upstream of the membrane, pressures of 400 and 20 psid must be supplied for saltwater and brackish water feed, respectively.

Using an electrolyte solution downstream of the membrane to drive the process will not be feasible for many foods or beverages because it would impart an undesirable taste. Therefore, the only alternative is to use membrane filtration in the reverse mode. In order to use membrane filtration in the reverse mode, pressure must be supplied to the upstream side of the membrane to overcome osmotic pressure. For the heating and hydration process to proceed, a passive chemical reaction must therefore be provided that generates heat and pressure.

Chemical biocide formulations have also been taught in U.S. Pat. Nos. 5,632,904, 6,303,039, and 6,638,431 by the present inventors. Formulations such as these can be integrated into self-heating and self-hydrating devices such as that taught in this invention, to provide additional water disinfection if needed.

Recognizing the deficiencies in past chemical heater reactions, namely, high temps, explosiveness, low or no pressure generation, and toxic or corrosive materials, we discovered an improved chemical formulation based on the FRH reaction with improved and advantageous properties required for a water heating and hydrating device. We also contemplate that other reactions which are exothermic and pressure generating, can be used to heat and hydrate foods from non-potable water.

SUMMARY OF THE INVENTION

This invention teaches the apparatus and method to heat and hydrate foods using an exothermic and pressure generating chemical reaction activated by water, spark, electrical impulse, squib, friction or shock. For water activation, water can be provided from any source, ranging from salt water to fresh water. Water is added to a chemical formulation, generating both heat from the exothermic reaction as well as pressure. The exothermic heat from the reaction transfers to water and the pressure provides the driving force for membrane filtration (e.g., reverse osmosis, nanofiltration, ultrafiltration, and microfiltration). Additional biocide formulations comprised of soluble metal salts and chelating agents can also be optionally used to augment disinfection. The heating and hydrating system can be used in a flexible or rigid container.

One object of this invention is to teach the chemical formulations that can be used to heat non-potable water and also provide sufficient pressure to drive non-potable water through a membrane filter to produce heated, potable water.

Another object of this invention is to teach a means for heating and hydrating dehydrated beverages and foods, and powdered drink mixes, from non-potable water, using an exothermic and pressure generating reaction.

A further object of this invention is to teach the method of using flexible pouches and bladders, and/or rigid containers for the heating and hydrating device.

Yet another object of this invention is to teach that any reaction which generates heat and pressure can be used in an integrated design to heat and filter non-potable water. Reactions which can generate both heat and pressure can be activated by processes including, but not limited to, water addition, spark, shock, squib, or electrical impulse.

Another object of this invention is to teach that non-potable water can be heated and filtered with potable water fluxes of about 0.06 milliliters per square centimeter per minute, or faster.

Yet another object of this invention is to teach that the chemical compositions can be used to heat water to at least about 150 F in 30 minutes or less, and preferably 15 minutes or less.

A further object of this invention is to teach that soluble metal salts and chelating agents can be used to augment disinfection of the non-potable water.

Other objects, advantages and novel features of the present invention will become apparent from the following detailed description of the invention when considered in conjunction with the accompanying drawings.

DETAILED DESCRIPTION OF THE INVENTION

According to the present invention, an exothermic chemical reaction, activated by water, spark, electrical impulse, squib, friction or shock, is used to heat water and force the non-potable water through a membrane filter using the pressures generated by the reaction. The resulting filtered water can then be used to hydrate foods and beverages. Examples of exothermic reactions activated by one of these means, and generating a gaseous product (e.g., $H_2$, $O_2$, or $N_2$) are listed below:

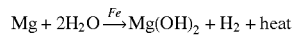
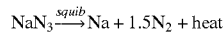

$$Mg + 2H_2O \xrightarrow{Fe} Mg(OH)_2 + H_2 + heat$$

$$2KO_2 + H_2O \longrightarrow 2KOH + 1.5O_2 + heat$$

$$NaN_3 \xrightarrow{squib} Na + 1.5N_2 + heat$$

Combinations of reactants with differing activation means are also contemplated by this invention. For example, combinations of Mg and $KO_2$ can be used to generate both $H_2$ and $O_2$, which may further react to form additional water and heat. Combinations of Mg and an azide are also contemplated, with the water activation of the Mg reaction creating enough heat to initiate the azide decomposition reaction which then generates more heat and pressure. Those skilled in the art will be familiar with other gas and heat generating reactions.

The advantage of this invention is that non-potable water can be heated and filtered by a single chemical reaction. This feature is very useful for remote military operations and campers, where potable water or power is limited or not available. This invention advantageously uses all aspects of certain chemical reaction, i.e., exothermic heat and pressure generation, and not just the exothermic heat generated by the reaction as in current MRE's.

Figure 1A:
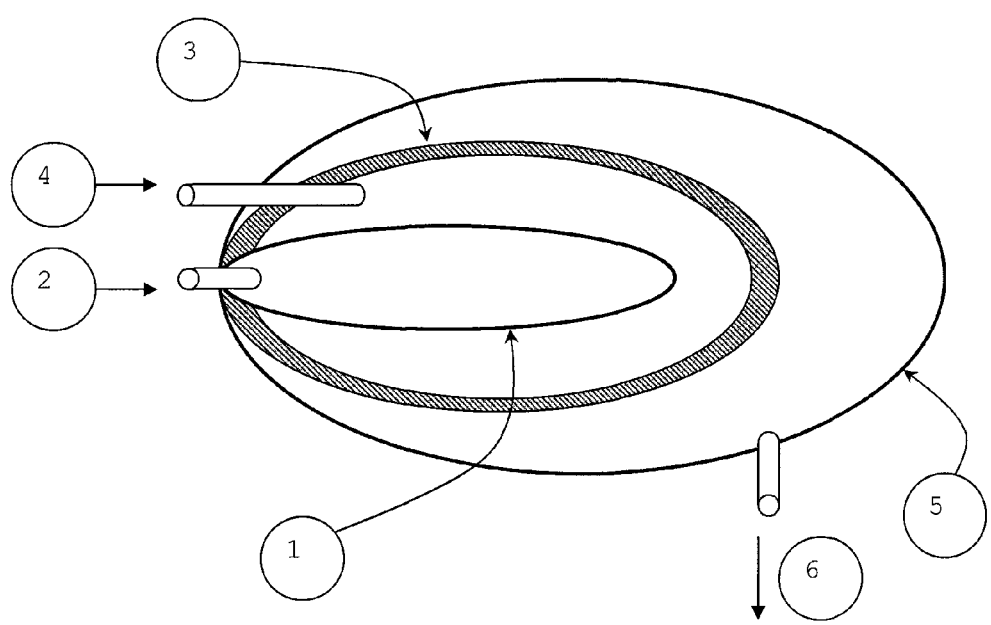
FIG. 1a is a schematic of a pouch embodiment of this invention.
Figure 1B:
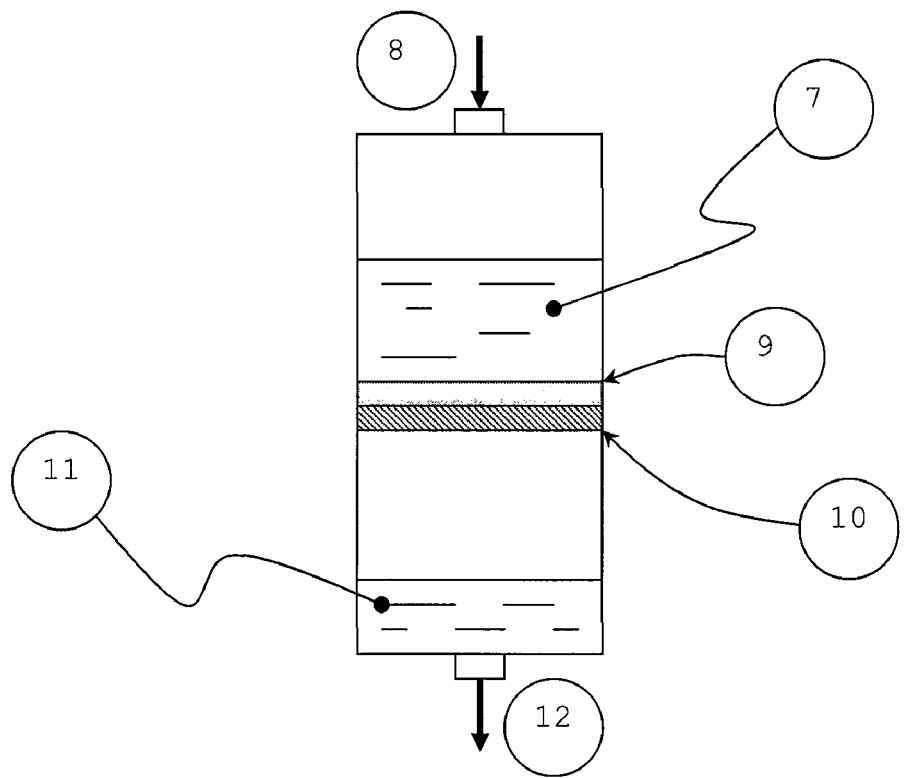
FIG. 1b is a schematic of a rigid can embodiment of this invention.

A preferred embodiment is to use a reaction activated by water. One embodiment, a flexible pouch, is depicted in FIG. 1a where water is added through port 2 to an inner bladder 1 containing the heat and pressure generating chemicals, and a separate amount of water is added to the membrane pouch 3 through port 4. As water is added to the chemicals in the inner bladder 1, a reaction occurs that generates heat and pressure. The heat is transferred from the inner bladder 1 to the surrounding water in the membrane pouch 3. As the reaction proceeds, the inner bladder 1 expands creating pressure on the water in the membrane pouch 3, forcing this water through the membrane comprising the membrane pouch 3. The membrane pouch 3 may also be reinforced with wire, mesh, ribs, or the like. Potable and heated water is then collected in an outer pouch 5 for use in hydrating and heating foods and beverages. In the depicted embodiment, the heated and filtered water could be extracted through port 6. FIG. 1b shows another embodiment of this invention is a rigid device consisting of a can or the like, separated into two main compartments by a supported membrane filter. Referring to FIG. 1b, water is added to one side of the rigid structure containing the heating chemicals through port 8, which is then closed. As the reaction proceeds, pressure and heat is generated by pushing water 7 through the membrane element 9 supported by a permeable grid or grate 10 and into the second compartment as heated, filtered water 11. A pre-filter (not shown) could also be used on top of the membrane element 9. The membrane element 9 will then filter out contaminants in the water as well as any unreacted chemicals such as ions that are toxic or non-consumable and salt products produced by the reaction with the water, thereby creating portable hot water which can be extracted through the port 12 for hydrating powdered beverages or dehydrated meals. For this embodiment, the preferred membrane element would be either an RO or NF type, since these will remove some ionic species that will result from the reaction and that are not consumable. Acids can also be used in this embodiment as part of the chemical formulation to achieve a neutral pH in the filtered water. We have found that acids such as fumaric acid, benzoic anhydride, glacial acetic acid, maleic anhydride, salicylic acid, citric acid, boric acid, adipic acid, and hydrates thereof are useful for this effect. Acid salts including, but limited to $AlCl_3$, $Fe(NO_3)_3$ and hydrates thereof can also provide for pH control.

Water is filled through port 21 into compartment 22 containing the chemical formulation. The chemicals could be pre-loaded or added by fill port 21. As the reaction proceeds, bladder 23 expands forcing water in compartment 25 (e.g., lake, sea, fresh, brackish) pre-filled through port 24 through the membrane 26. The water in compartment 25 is heated through the interfacial area of the expandable bladder 23. The membrane is directly connected to a dehydrated meal or beverage 27, where heated potable water is flowed by permeation through the membrane into the meal or beverage.

Figure 1C:
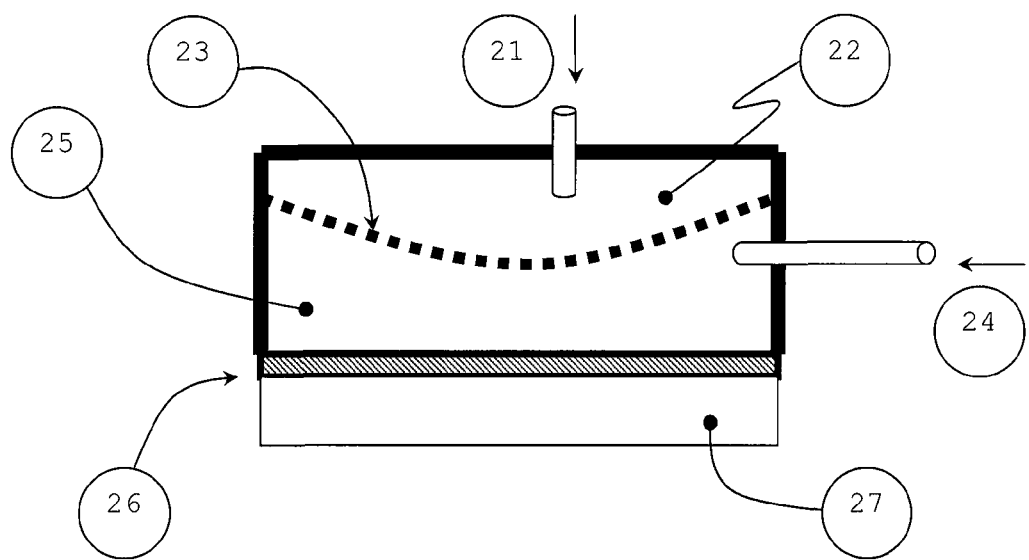
FIG. 1c is a schematic of an embodiment of this invention with an integrated dehydrated food or beverage.

Referring to FIG. 1c, a dehydrated food or beverage container 27 is directly integrated onto the membrane pouch element 26 so that water is not collected, but rather, directly added to the food or beverage container 27 attached to it as it permeates through the membrane element 26, through the membrane element 26. In this configuration the dehydrated food or beverage can include salts and other electrolytes which would lower the osmotic pressure required to force water through the membrane.

There are numerous reactions that generate heat contacted with water. For a heater and hydrator system to function, however, it is necessary that the reaction also generate pressure to force water through a membrane filter. The heat generated by the reaction also increases the potable water permeate flux through a membrane since permeation rates generally increase with temperature. The reaction of magnesium with water, catalyzed by iron, is a very exothermic reaction with a heat of reaction equal to 14534 kJ/kg of Mg. We also discovered that the addition of sodium chloride in an amount of 3-30 percent relative to the Corrodalloy-5, preferably 10-30 weight percent, greatly improves the kinetics of the reaction, which provides for vast amounts of heat and pressure in a short period of time. For a heater and hydrating system to be useful, the water must be filtered and heated in a short duration, typically on the order of minutes. We also discovered that the addition of salts such as $AlCl_3$, $Fe(NO_3)_3$ and hydrates thereof, to the FRH chemicals, also provides improvements to pressures, temperatures, and/or kinetics when reacted with water.

One preferred chemical formulation for a water activated heating and hydrating device comprises about 28-97 wt % Corrodalloy-5, 3-30 wt % NaCl, 0-50 wt. % $Fe(NO_3)_3$ hydrate and 0-24 wt % $AlCl_3$. The typical composition of commercially available Corrodalloy-5 material comprises about 95 wt. % Mg and 5 wt. % Fe, so the range of compositions of Mg and Fe in said preferred composition is about 27-92 wt. % and 1-5 wt. %, respectively. There are also other acid salts that could be used for this purpose, as would be familiar to those skilled in the art. Acid salts will produce an acidic solution in water, and since the reaction of Mg with water creates a basic solution, the reaction of the acid and base in the water provides for additional heat energy for heating water. Using these and related salts in a hydrate form can also be advantageous, since additional water would be provided by the reactants requiring less water addition from an external source.

The chemical compositions of this invention can be added by a user or pre-loaded in the device by the manufacturer. The form of heat and pressure generating chemicals can range from loose powder to briquettes or pellets.

Various membrane elements can be used in this device. Membranes are typically characterized as reverse osmosis (RO), nanofiltration (NF), ultrafiltration (UF), and microfiltration (MF). These membrane elements are typically comprised of polymers which can be heat sealed into a pouch form, and include, but are not limited to, thin film composites (TFC), polytetrafluoroethylene (PTFE), polyamide (PA), polyvinylidene fluoride (PVDF), polyethersulfone (PES), ceramic, cellulose acetate (CA), polysulfone (PS), and polycarbonate (PCTE). Alternatively, the membrane could be sealed by elastomer gasket or the like in a frame, and/or the membrane could also be supported by a metal, plastic or composite mesh for support and to minimize any ripping or tearing due to pressure. Metal support wires, ribbons, rubs, or the like can also be integrated with the membrane pouch to improve heat transfer between the heated water of the inner bladder and the water in the membrane pouch.

A pre-filter can also be integrated into the device to remove larger particulates prior to permeating through the membrane element. The prefilter element can be a membrane sheet layered with the membrane filter material, and is typical categorized as a UF or MF membrane.

The forgoing embodiments make use of a membrane element in the form of a pouch or sheet. However, it is contemplated that other forms of membrane elements could be used by this invention; including, hollow tubes and spiral wound elements.

Depending on the water source used (e.g., fresh, lake, brackish, sea) as well as the type of membrane used in the device, additional disinfection may be needed to render the water potable. Water soluble or slightly soluble metal salts and chelating agents can be used in the device to achieve potable water in these instances. One embodiment entails the addition of these agents into the membrane pouch, or, these chemicals could be pre-packaged as part of the pouch. The chemicals dissolve when water is added, disinfecting the water before it is filtered through the membrane pouch. In another embodiment, the biocide chemicals are added to the outer pouch (or pre-packaged) so that the final concentrations of the ions in the water are below EPA drinking water standards, and hence, non-toxic for human consumption. Biocide formulations useful in this invention include, but are not limited to, combinations of the following: silver sulfate, anhydrous, copper sulfate pentahydrate, zinc sulfate heptahydrate, nickel sulfate hexahydrate, disodium EDTA dihydrate, trisodium citric acid dihydrate, sodium salicylic acid, and trisodium NTA hydrate. Those skilled in the art will recognize that other metal salts and chelating agents with varying degrees of solubility in water would be equally effective.

Another embodiment of this invention can use an oxide material that reacts with water to generate $O_2$. Examples include, but are not limited to $KO_2$, $K_2O_3$, $K_2O_2$, $Na_2O_2$, $CaO_2$, and $MgO_2$. A further embodiment is to use a chemical formulation that includes one or more gas generating compounds that generate heat and pressure by evolution of a gas (e.g., $N_2$, $CO_2$) by shock, electrical impulse, or squib. Examples of this type of chemical system include, but are not limited to, azides, tetrazoles, and guanidine compounds.

EXAMPLES

Example 1

Figure 2A:
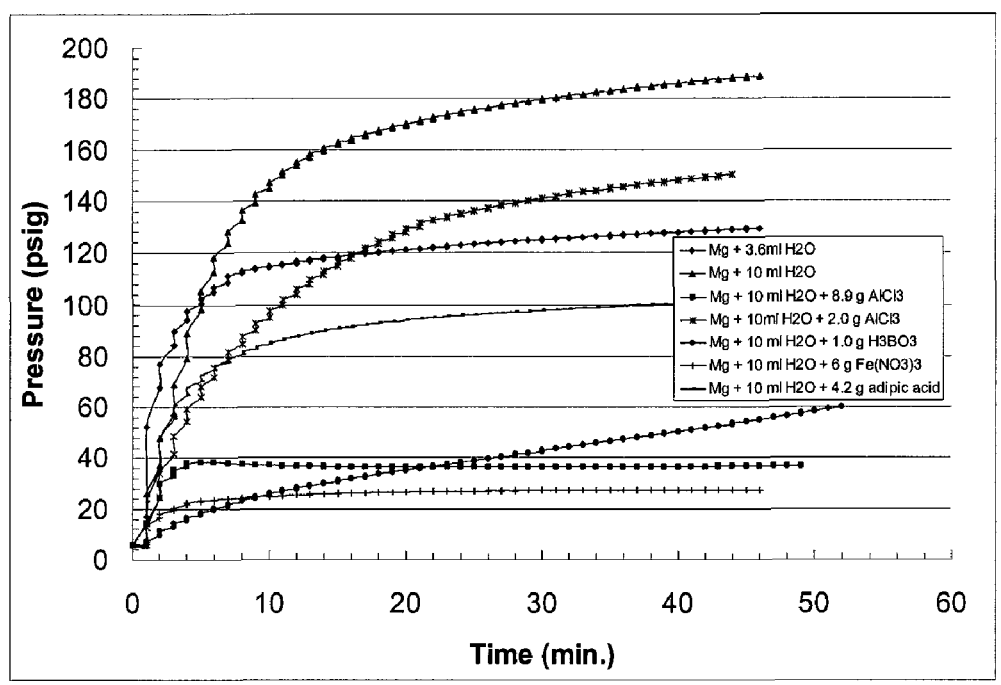
FIG. 2a is a graph of pressures generated by various water activated exothermic reactions with acids and other reaction modifiers.

FIG. 2a shows the pressures generated by several reactions using Mg and water. This graph shows several modifications of this base reaction with the addition of an acid or acid salt [$AlCl_3$, $H_3BO_3$, food grade adipic acid, and $Fe(NO_3)_3$] to neutralize (i.e., pH near 7) the $Mg(OH)_2$ that is generated by the FRH reaction. Pressures greater than 180 psig can be achieved, making these reactions suitable for a broad spectrum membrane filters. The pressure can also be moderated to lower pressures by addition of these other components.

Figure 2B:
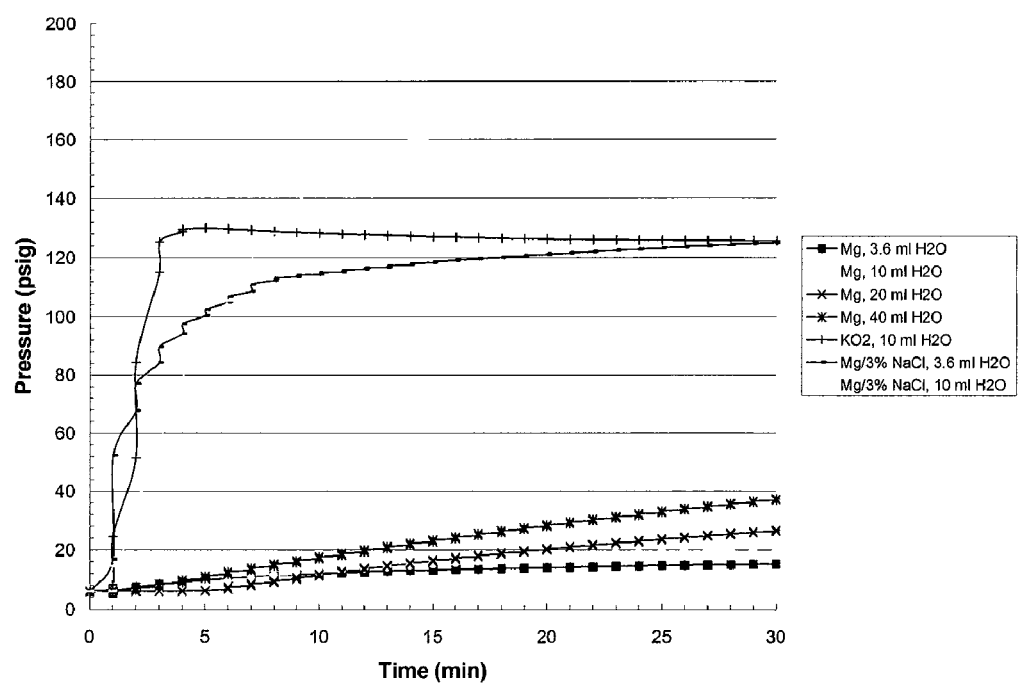
FIG. 2b is a graph of pressures generated by the FRH water activated exothermic reaction with and without the NaCl modifier.

FIG. 2b also shows examples of the pressures generated by the reactions. This graph illustrates the importance of reaction modifiers, such as NaCl, to accelerate the kinetics of the reaction so that the pressure is reached very quickly for membrane filtration. The pressures generated by the reaction of Corrodalloy-5 (labeled "Mg" on the legend) with varying amounts of water are far less than the same reaction where only 3 wt. % NaCl is included in the formulation. FIG. 2b also shows that pressures exceeding 120 psig can be attained using $KO_2$ reacted with water; this reaction also generates exothermic heat.

Example 2

Figure 3:
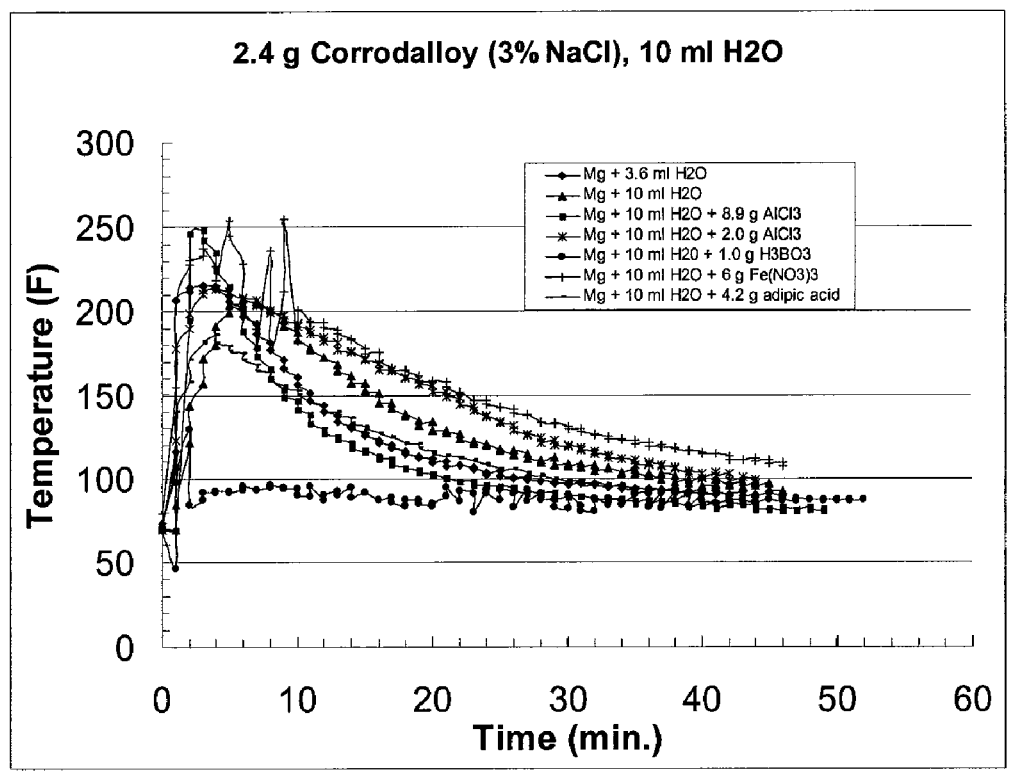
FIG. 3 is a graph of the temperatures generated by various FRH reactions modified with acids and other modifiers.

FIG. 3 shows the temperatures generated by several reactions using Mg and water. The magnesium material is Corrodalloy-5 (approximately 95% Mg and 5% Fe), manufactured by Dymatron. This graph shows several modifications of this base reaction with the addition of an acid or acid salt. The additional of $AlCl_3$ and $Fe(NO_3)_3$ hydrate were found to increase the reaction temperature over the base material of Mg with 3 weight percent NaCl.

Example 3

Figure 4:
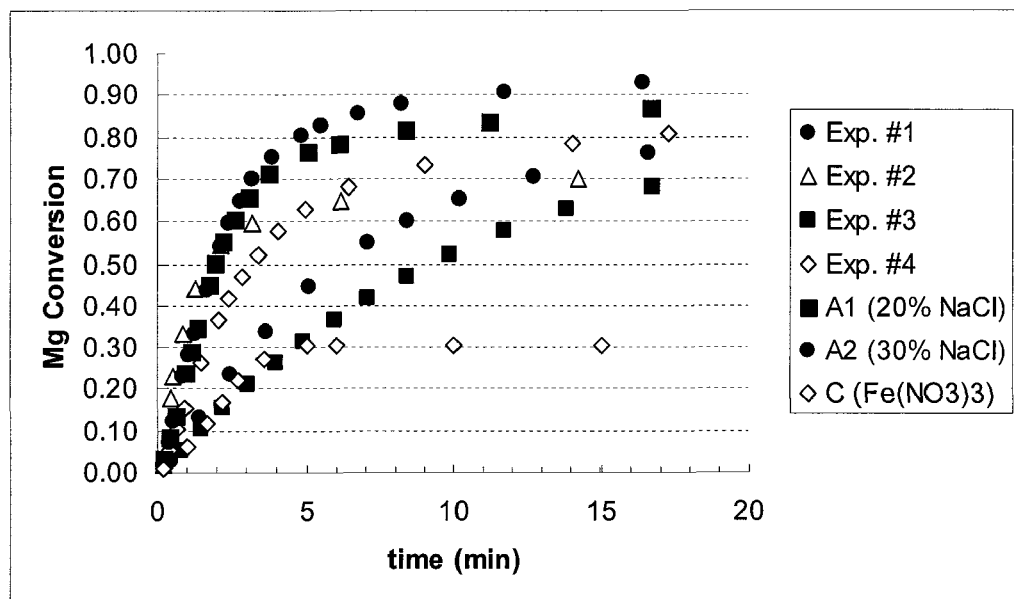
FIG. 4 is a graph of the Mg conversion from the FRH reaction using different modifiers.

FIG. 4 shows the reaction kinetics of the FRH reaction (equation 1) with reaction modifiers. We discovered that the reaction kinetics can be greatly increased by addition of NaCl, which is critical for this invention. The kinetics test added varying amounts of NaCl and $Fe(NO_3)_3$ to the FRH reaction (equation 1). The kinetics were measured by the volume of hydrogen generated as a function of time. Per equation 1, this can be related back directly to moles of Mg consumed (1:1 ratio). These experiments were carried out with varying amounts of water reactant.

All reactions depicted in FIG. 4 used 1 gram of Corrodalloy-5 (95% Mg, 5% Fe) with varying amounts of NaCl, water reactant, and $Fe(NO_3)_3$ hydrate. Exp. #1 used 3 wt. % NaCl relative to the Corrodalloy-5 material with 300% excess water by equation 1, Exp. #2 used 10 wt. % NaCl relative to the Corrodalloy-5 material with 300% excess water by equation 1, Exp. #3 used 3 wt. % NaCl relative to the Corrodalloy-5 material with 700% excess water by equation 1, and Exp. #4 used 10 wt. % NaCl relative to the Corrodalloy-5 material with 700% excess water by equation 1. Experiment "A1" was the same as Exp. #4 but with 20 wt. % NaCl, and experiment "A2" was the same Exp. #4 but with 30 wt. % NaCl. Experiment "C" used 1 gram of Corrodalloy-5, 10 wt. % NaCl relative to the Corrodalloy-5, 200% excess water by equation 1, and $Fe(NO_3)_3$ hydrate. The 15-min conversion of the reaction was also maximized by higher NaCl and excess water. Increasing amounts of NaCl increased the reaction kinetics, but the increase seemed to weaken with compositions of NaCl greater than about 10 wt % relative to the Mg in the Corrodalloy-5 material. As shown in FIG. 4, the reaction conversion was decreased by the addition of $Fe(NO_3)_3$ hydrate. The addition of $Fe(NO_3)_3$ hydrate provides a means to moderate the generation of hydrogen gas and therefore the pressure in the system. This salt also dissolves to form an acidic solution which reacts with $Mg(OH)_2$ to give off additional exothermic heat.

Example 4

Figure 5:
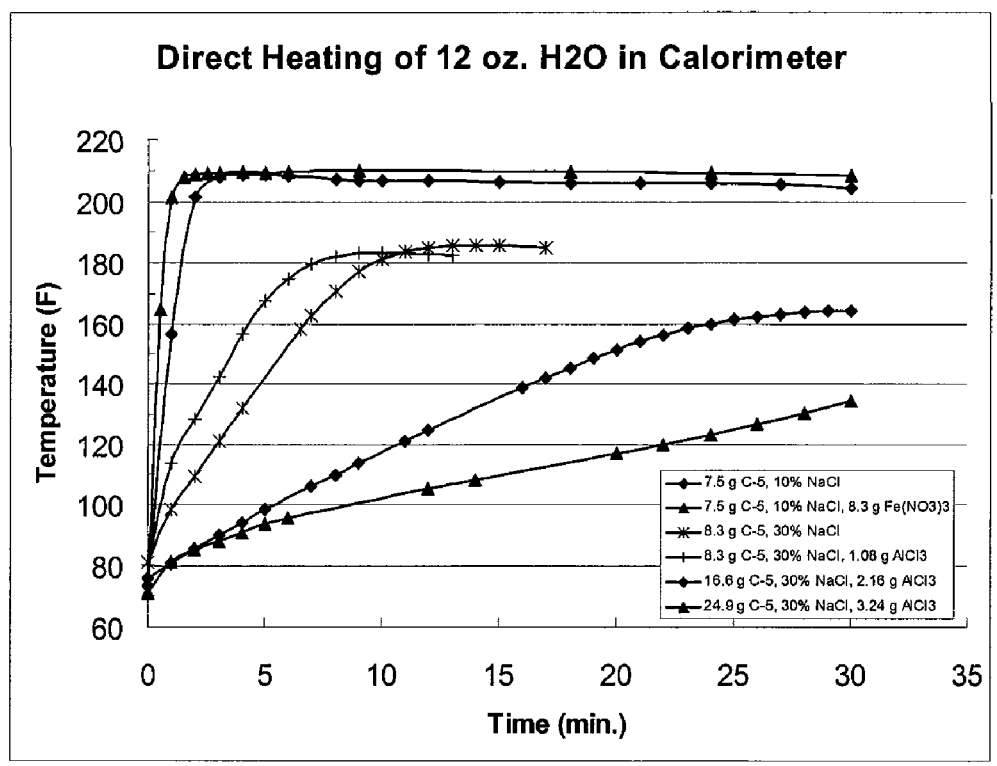
FIG. 5 is a graph of water temperatures generated by the FRH reaction modified with differing amounts of NaCl, $AlCl_3$, and $Fe(NO_3)_3$ hydrate.

FIG. 5 shows the results for varying weights of Corrodalloy-5, NaCl, and $AlCl_3$ added directly to 12 fl oz of water. As shown in the figure, the weight of Corrodalloy-5, NaCl, and $AlCl_3$ had strong effects on the final water temperature, the rate of temperature increase, and the duration of the temperature. In summary, a heater reactant composition of approximately 64 wt % Corrodalloy-5, 27 wt % NaCl, and 8 wt % $AlCl_3$ at a ratio of about 0.07-0.11 grams of total reactant per gram of water to be heated (e.g., 12 fl oz) produced a fast and high temperature heater reaction. For example, to heat 12 fl oz of water (355 ml), 26-39 grams of heater reactant mix was needed. Compounds such as $AlCl_3$, $Fe(NO_3)_3$, and NaCl can be used to accelerate reaction kinetics and control pressure.

These experiments also revealed that the $Fe(NO_3)_3$ component reduced the kinetics of the reaction as measured by temperature rise, as well as the ultimate temperature. However, $AlCl_3$ and NaCl both exhibited a very beneficial effect on the kinetics of the reaction (faster temperature rise). As shown in FIG. 5, the modified FRH reaction is much faster in directly heating water. The Corrodalloy-5 material is abbreviated as "C-5" in the graph legend. These experiments represent a chemical system different than the MRE heater trays, since excess water (12 fl. oz.) is used. It does, however, demonstrate that the modified FRH reaction can heat water to boiling very quickly even with excess water, and the unmodified FRH chemicals are much slower and produce a lower temperature after 15 minutes with excess water.

Example 5

Figure 6:
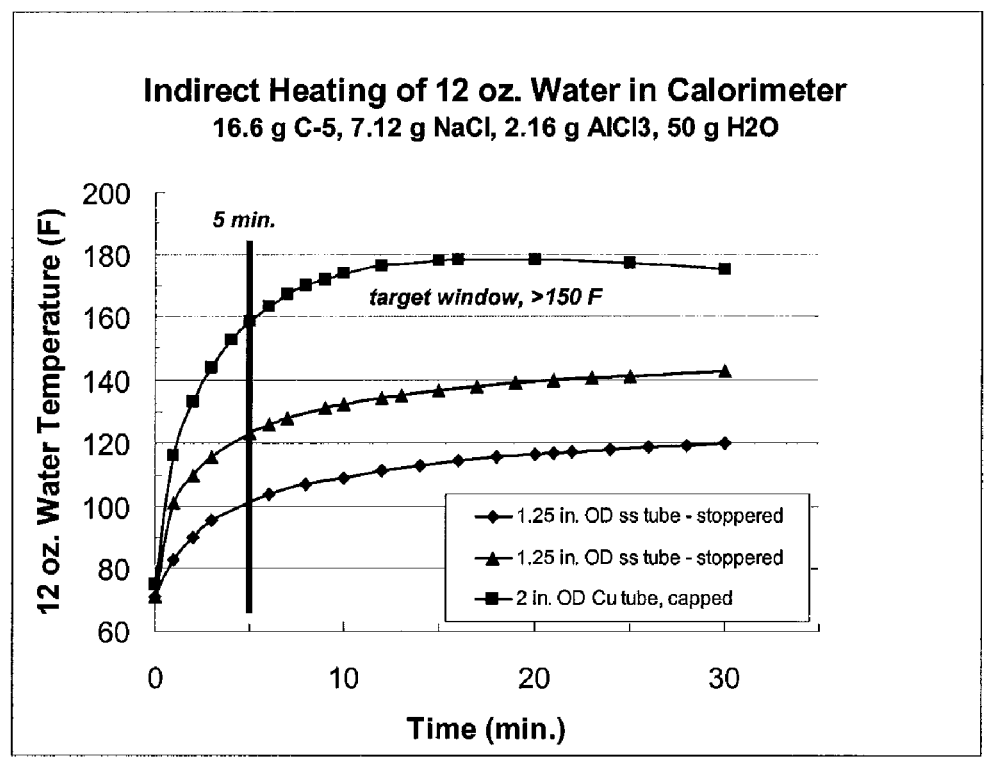
FIG. 6 is a graph of water temperatures indirectly heated by a modified FRH reaction.

FIG. 6 is an example of experiments where water was indirectly heated by the reactions of this invention. The heater chemicals that were added to a reactor tube were 16.6 g Corrodalloy-5, 7.12 g NaCl, 2.16 g $AlCl_3$, and 50 g water reactant. The stoichiometric ratio of water to Corrodalloy-5 per equation 1 is 1.4 grams water per gram (Corrodalloy-5 is about 95% Mg by weight). The ratio used for the experiments in FIG. 6 was 3.0, or about 2× the stoichiometric requirement. The ratio of reactant weight to weight of water being heated (12 fl oz or 355 grams) was (16.6+7.12+2.16)/355=0.073. The 12 fl oz water temperature for the copper tube rose to 150° F. in less than 5 minutes and continued to rise over a 15-minute period, peaking around 180° F. This experiment illustrates how water and chemical formulations in a separate compartment can be used to indirectly heat water, communicating only by heat transfer surfaces. This is the mechanism of water heating for one embodiment of this invention.

Example 6

Figure 7:
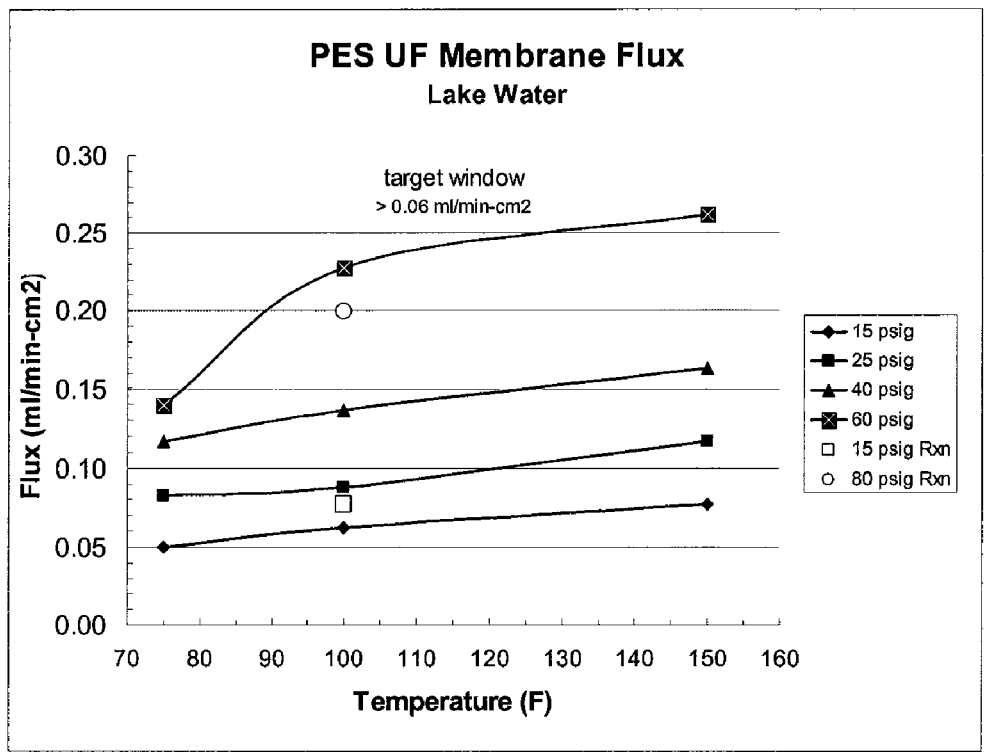
FIG. 7 is a graph of the membrane permeate flux for a PES UF membrane as a function of temperature for different pressures using lake water as the water source.
Figure 8A:
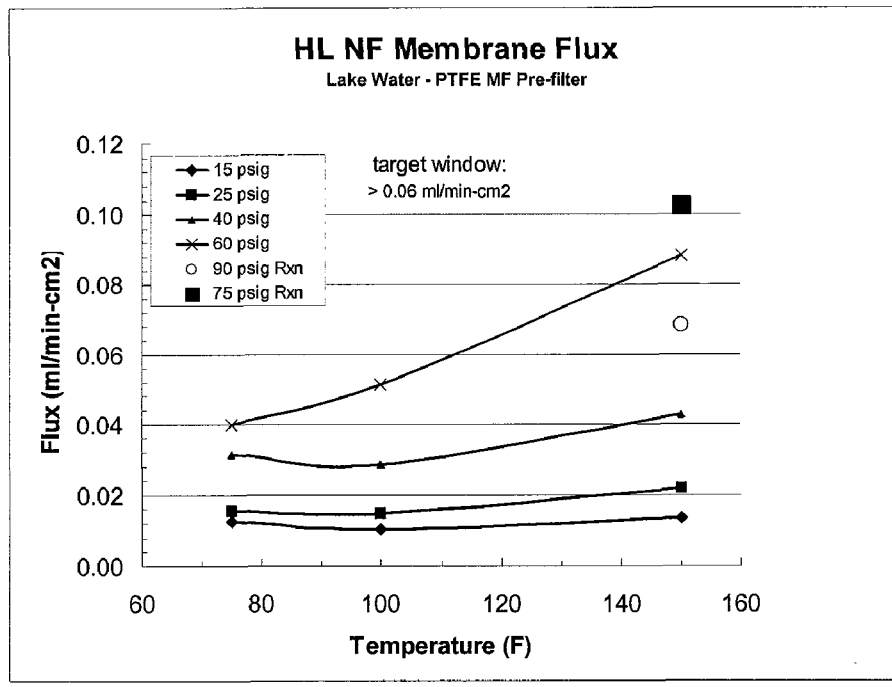
FIG. 8a is a graph of the membrane permeate flux for an NF membrane with MF pre-filter as a function of temperature for different pressures using lake water as the water source.
Figure 8B:
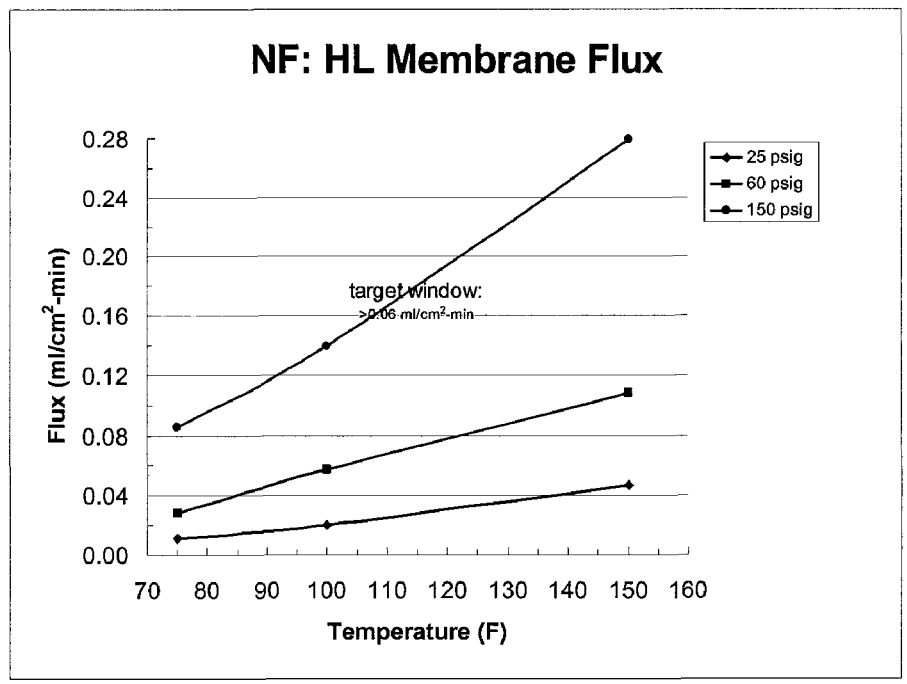
FIG. 8b is a graph of the membrane permeate flux for an NF membrane as a function of temperature for different pressures using fresh water as the water source.

Pressurization testing was performed to demonstrate that the pressure generated by the modified FRH reaction could push fresh and lake water through membrane filters. FIGS. 7, 8a, and 8b are examples with two different membranes: a Sterlitech polyethersulfone (PES) UF membrane, and a Sterlitech HL NF membrane with a PTFE MF pre-filter. FIGS. 7 and 8a show the resulting permeate water fluxes as a function of temperature and pressure using lake water. In these experiments, we targeted permeate fluxes of 0.06 ml/$cm^2$-min or greater, or 12 fl. oz. of water in 15 minutes or less, with a membrane area of about 350 $cm^2$ (a device having a footprint of 20 cm×17.5 cm for example). In the two experiments performed with the PES UF membrane, pressures of 15 psig and 80 psig were achieved, and the corresponding fluxes achieved were 0.0769 ml/min-$cm^2$ and 0.199 ml/min-$cm^2$, respectively. These results are plotted in FIG. 7, along with the lake water permeation rate data previously obtained during membrane characterization experiments. Both fluxes obtained exceeded the minimum target flux of 0.06 ml/min-$cm^2$ FIG. 8a shows experiments with the HL NF membrane and PTFE MF pre-filter using lake water. Pressures of 75 and 90 psig were achieved resulting in fluxes of 0.103 and 0.0684 ml/min-$cm^2$, respectively, again exceeding the target flux of 0.06 ml/min-$cm^2$. FIG. 8b shows the permeate fluxes through the HL NF membrane using fresh water.

Example 7

Water was indirectly heated by a modified FRH reaction and used to heat and hydrate a powdered scrambled egg mix (3 oz heated water), freeze-dried scrambled eggs and bacon (4 oz heated water), a partial pack of the freeze-dried Mexican-style rice and chicken (57.4 grams freeze-dried rice & chicken and 6 oz heated water), and a partial pack of dehydrated beef stew (44.5 grams dehydrated beef stew and 6 oz heated water), and freeze-dried coffee (5 oz heated water). To heat 12 fl oz of water, 16.6 grams of Corrodalloy, 7.1 grams of NaCl, 2.16 grams of $AlCl_3$, and 50 ml of water were added to the copper tube with the threaded cap and immersed in 12 fl oz of water inside a calorimeter. The water heated to 150° F. in less than 4 minutes, 180° F. in ten minutes, and peaked at about 185° F. after about 15 minutes. This water was then added to scrambled egg mix, freeze-dried scrambled eggs with bacon, and instant coffee in the proportions on the directions.

Example 8

Figure 9A:
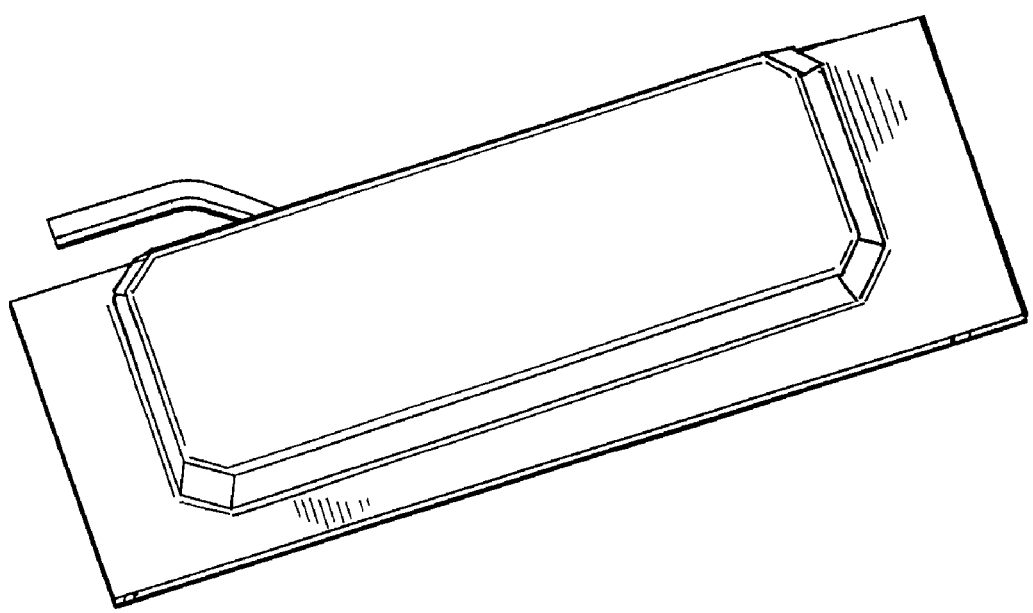
FIG. 9 is a series of photographs of a flexible pouch system for heating and hydrating foods or beverages.
Figure 9B:
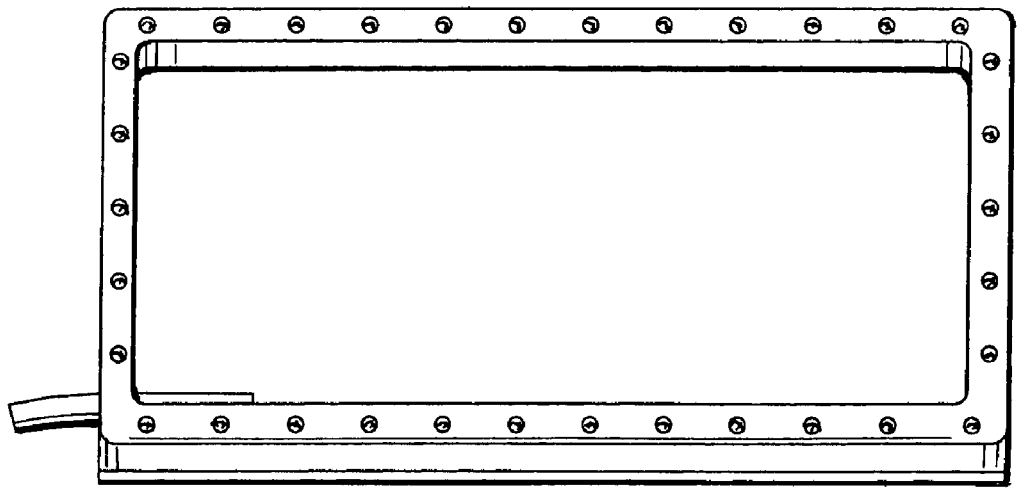
Figure 9C:
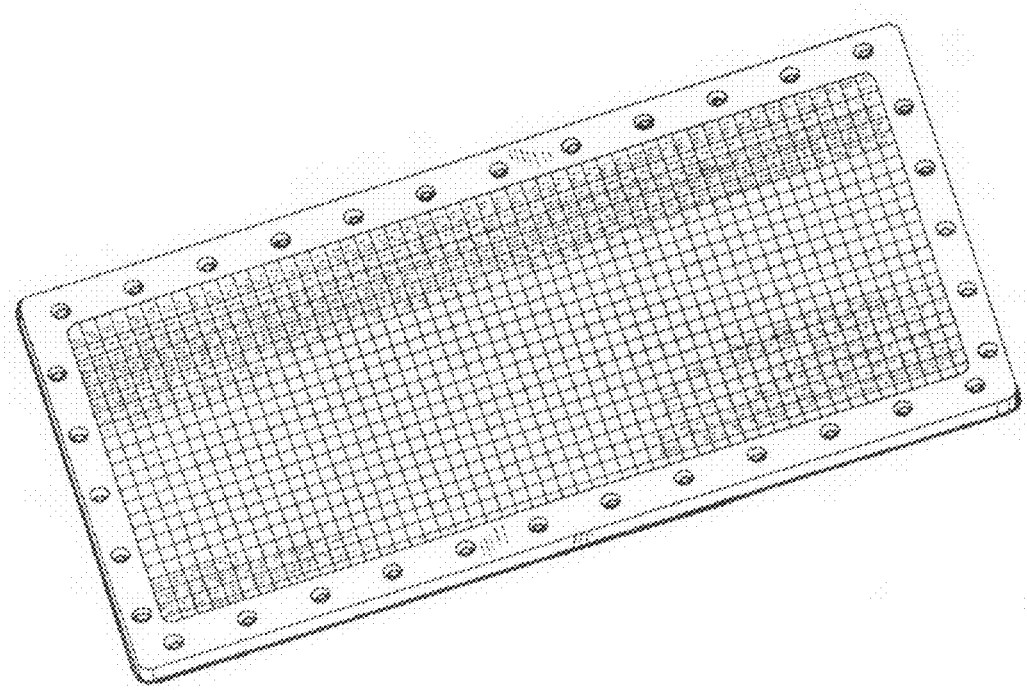
Figure 9D:
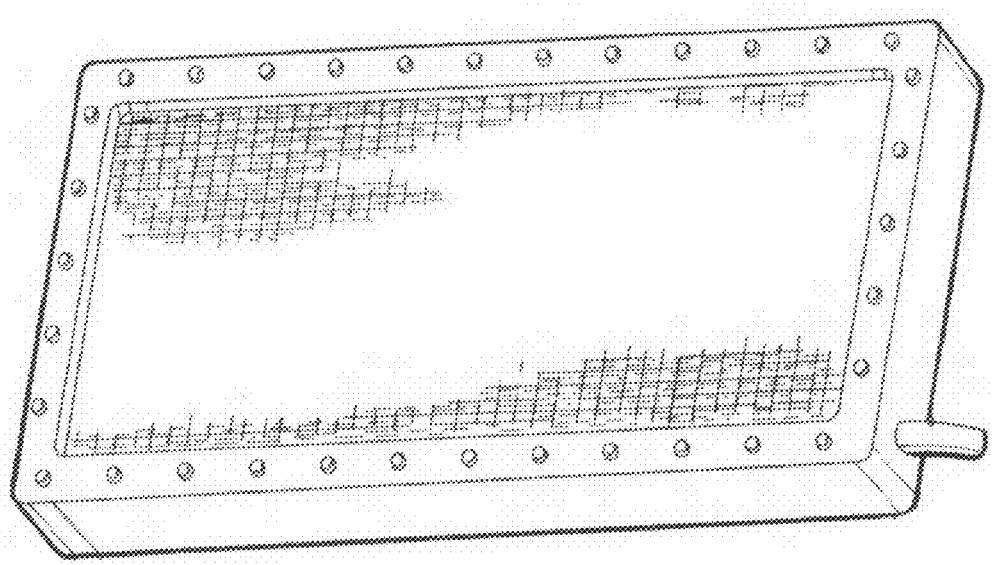
Figure 10:
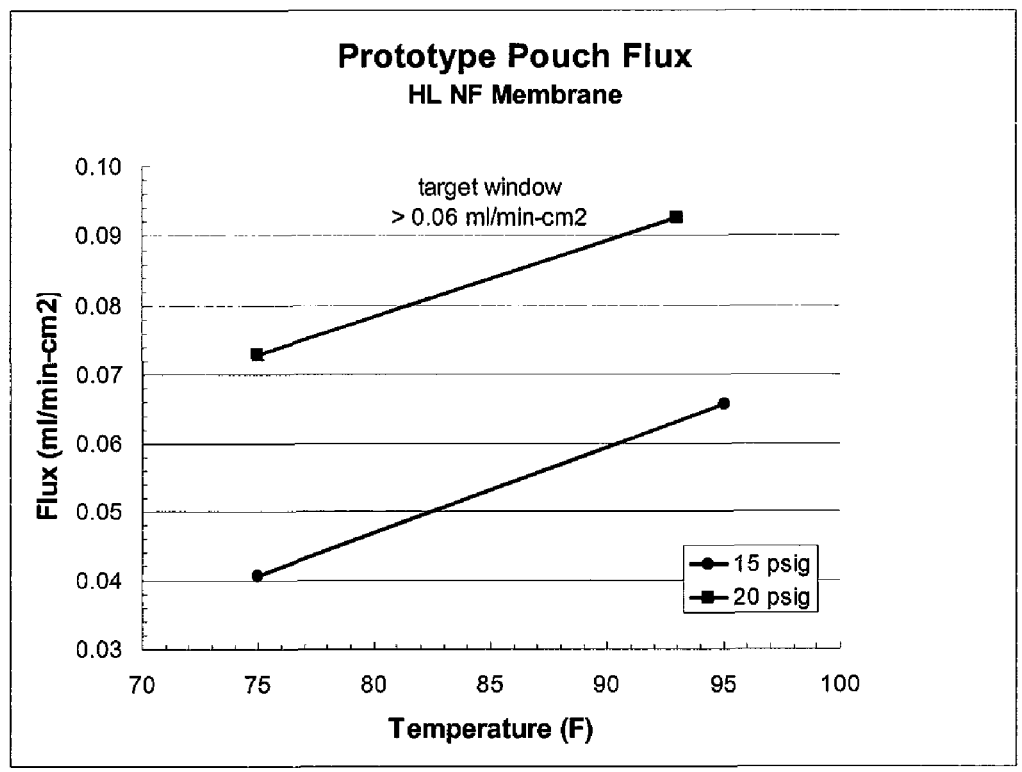
FIG. 10 is a graph of the permeate flux for a flexible pouch system.

A pouch device was manufactured to measure membrane fluxes resulting from inner bladder pressurization and heated water. This device consisted of an inner bladder, capable of withstanding pressure, and an outer membrane pouch. This design consisted of a high pressure, reinforced polyvinyl inner bladder (FIG. 9a) sealed within a filtration membrane (FIG. 9b) supported by a wire mesh (FIG. 9c). The assembled device is shown in FIG. 9d. The membrane area for this test device was 541 cm$^2$, for an approximate area footprint of about 10"×4". Hot water (120 F) was added to the membrane pouch and the inner bladder was then pressurized. FIG. 10 shows the resulting permeate fluxes through the Sterlitech HL NF membrane pouch as a function of pressure and temperature. This NF membrane was a thin film composite type.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for treating water, comprising
   (a) an inner bladder;
   (b) a membrane-containing pouch enclosing the inner bladder;
   (c) an outlet to discharge the treated water from the membrane-containing pouch;
   (d) a chemical formulation in the inner bladder to react exothermically with water and generate pressure;
   (e) at least one fill opening for the inner bladder;
   (f) at least one fill opening for the membrane pouch.

2. The apparatus of claim 1, wherein the membrane pouch is a membrane filtration material.

3. The apparatus of claim 2 wherein a mesh comprised of a material selected from the group consisting of plastic, metal, or composite is arranged to support the membrane pouch.

4. The apparatus of claim 1, wherein the chemical composition comprises:
   (a) magnesium
   (b) an Fe catalyst
   (c) a reaction modifier.

5. The apparatus of claim 4, wherein the reaction modifier is selected from the group consisting of NaCl, Fe(NO$_3$)$_3$, Fe(NO$_3$)$_3$ hydratus, AlCl$_3$, and AlCl$_3$ hydrate.

6. The apparatus of claim 1, wherein the membrane pouch contains a biocide formulation.

7. The apparatus of claim 1, wherein the outer pouch contains a biocide formulation.

8. An apparatus for treating water, comprising:
   (a) a bladder dividing a first compartment having a first port and a second compartment having a second port into which water can be supplied;
   (b) a chemical formulation selected to react exothermically with water and being preloaded in the first compartment or added through the first port before or after adding water through the first port;
   (c) a food or beverage container; and
   (d) a membrane operatively arranged between the second compartment and the food or beverage container so as to supply the treated water in the second compartment to the food or beverage container.

* * * * *